Feb. 15, 1927. 1,617,623
W. L. EVANS
RING JOINT MACHINE
Filed Sept. 16, 1925 5 Sheets-Sheet 1

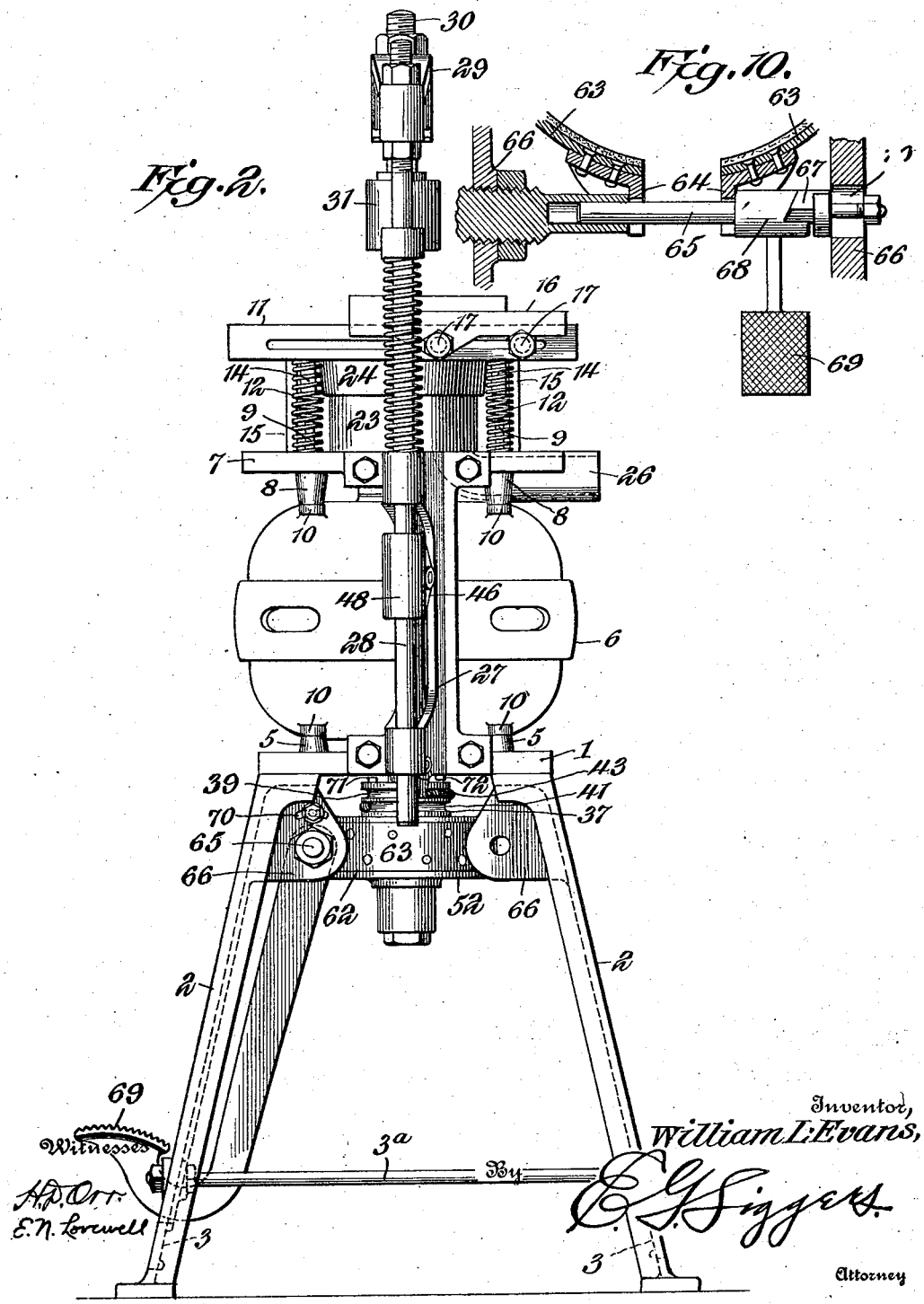

Feb. 15, 1927.
W. L. EVANS
RING JOINT MACHINE
Filed Sept. 16, 1925
1,617,623
5 Sheets-Sheet 3
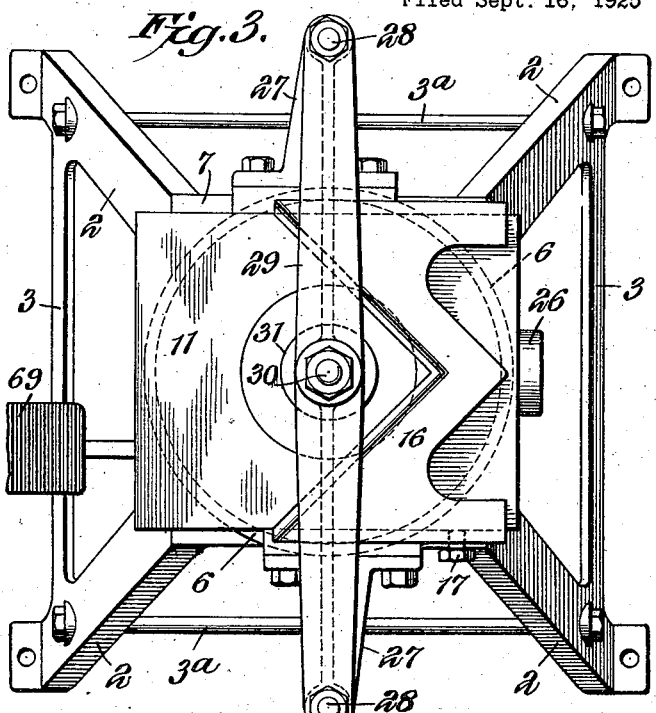
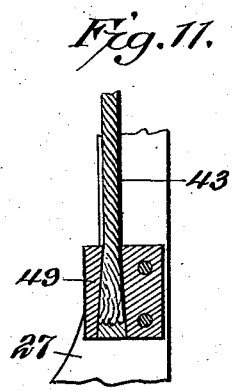
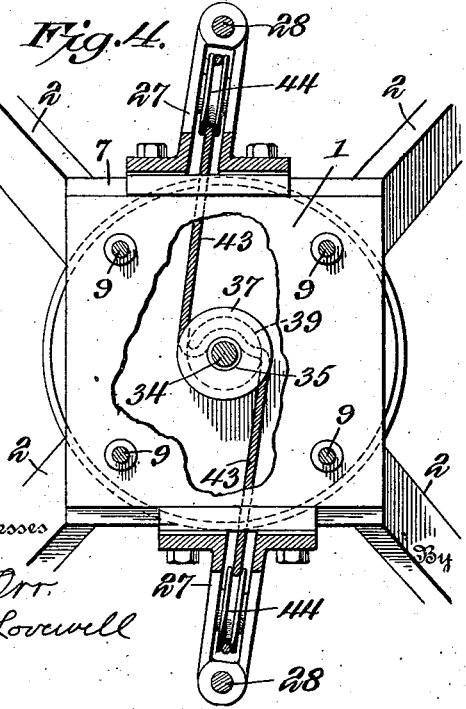
Inventor,
William L. Evans,
Witnesses
H. D. Orr.
E. N. Lovewell
By
E. G. Siggers.
Attorney Feb. 15, 1927.
W. L. EVANS
1,617,623
RING JOINT MACHINE
Filed Sept. 16, 1925  5 Sheets-Sheet 4
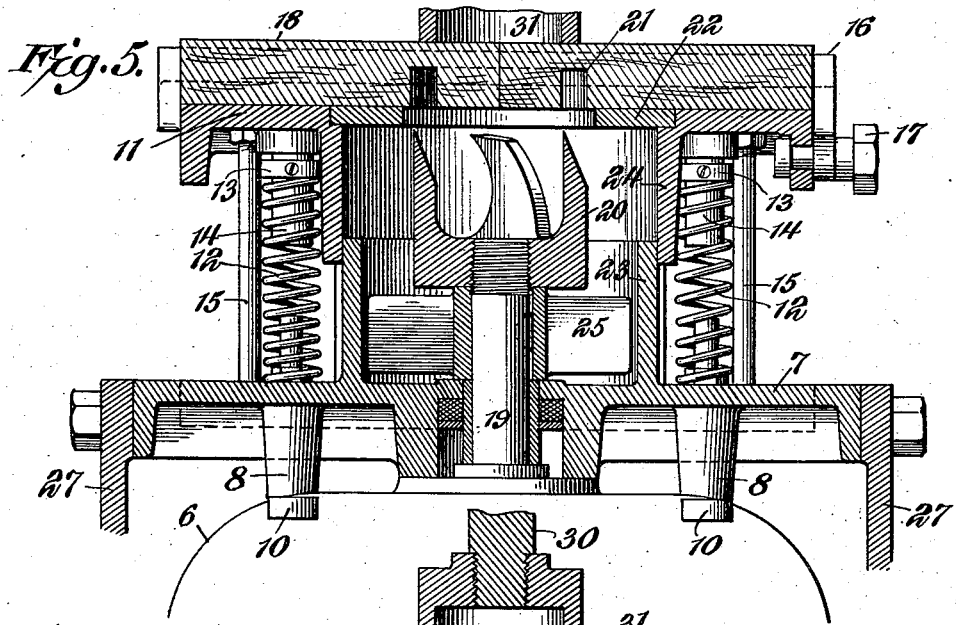
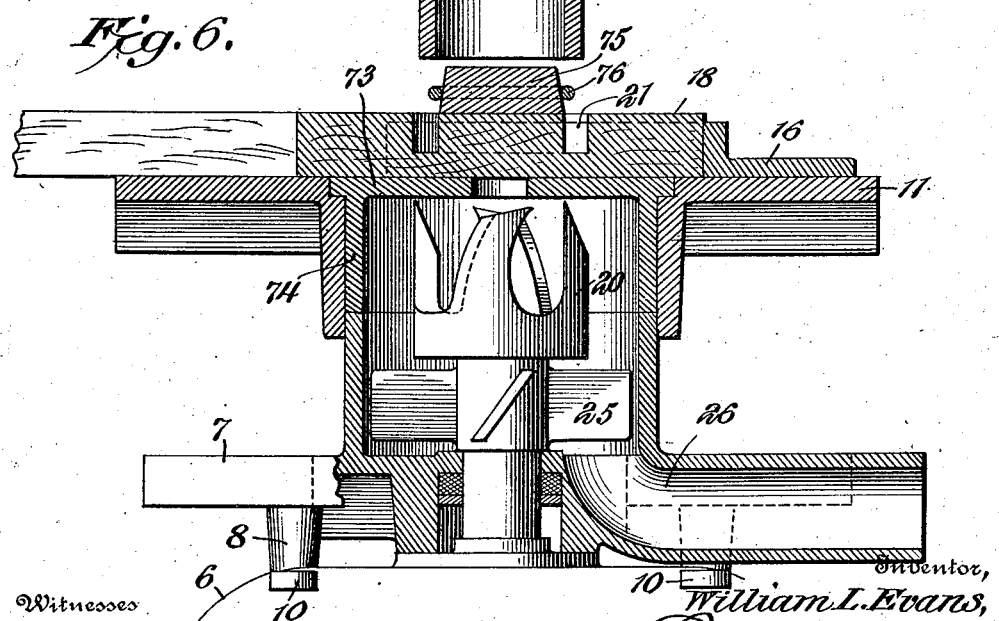
Witnesses
Inventor,
William L. Evans,
By
Attorney Feb. 15, 1927.
W. L. EVANS
1,617,623
RING JOINT MACHINE
Filed Sept. 16, 1925 5 Sheets-Sheet 5

Inventor,
William L. Evans,

Attorney

Patented Feb. 15, 1927.

1,617,623

UNITED STATES PATENT OFFICE.

WILLIAM LEWIS EVANS, OF WASHINGTON, INDIANA.

RING-JOINT MACHINE.

Application filed September 16, 1925. Serial No. 56,722.

This invention relates to a machine for joining trim, molding or other material by what is known as a ring joint. In making this type of joint, after the pieces to be joined are cut in the proper form, channels or grooves are cut in their rear faces in such a manner as to form a continuous circular channel when the pieces are properly joined. While the pieces are clamped in this position, a ring is forced into this channel, and the ring is of such size and shape that it will exert a powerful gripping action against the inner wall of the channel and hold the joint tightly together.

The objects of the invention include the provision of a simple and practical machine for the purpose described, which is economical in construction and easy to operate, and in which a high multiplication of power is obtained, so as to force the ring on with great pressure, thereby forming a joint which will not open even when there is considerable shrinkage in the wood itself.

In the operation of this machine, the pressure is directed on both sides of the work, and the work is first clamped and then operated upon by a continuous progressive movement of the operating mechanism. The motor forms a part of the body of the machine, and is directly connected to the operating mechanism. The cutter is screwed directly on one end of the motor shaft, and the other end of the shaft is connected directly to the transmission mechanism which operates the ram. The machine has but one actuating lever or pedal, which serves to actuate the machine in either cutting the channel or applying the rings.

In order to explain more fully the structural details of the invention and the principles of its operation, reference will be made to the accompanying drawings which illustrate one embodiment thereof.

In the drawings:

Figure 2 is a side elevation.

Figure 3 is a plan view.

Figure 4 is a horizontal section taken substantially on the line 4—4 of Figure 1.

Figure 5 is a central vertical section through the upper part of the machine, showing the position of the parts just after the channel has been cut.

Figure 6 is a central vertical section taken at right angles to the plane of Figure 5, showing the parts just before the ring is forced into the channel.

Figure 10 is a detail view of the brake operating mechanism.

Figure 11 is a detail view of the cable anchoring means.

Figure 1:
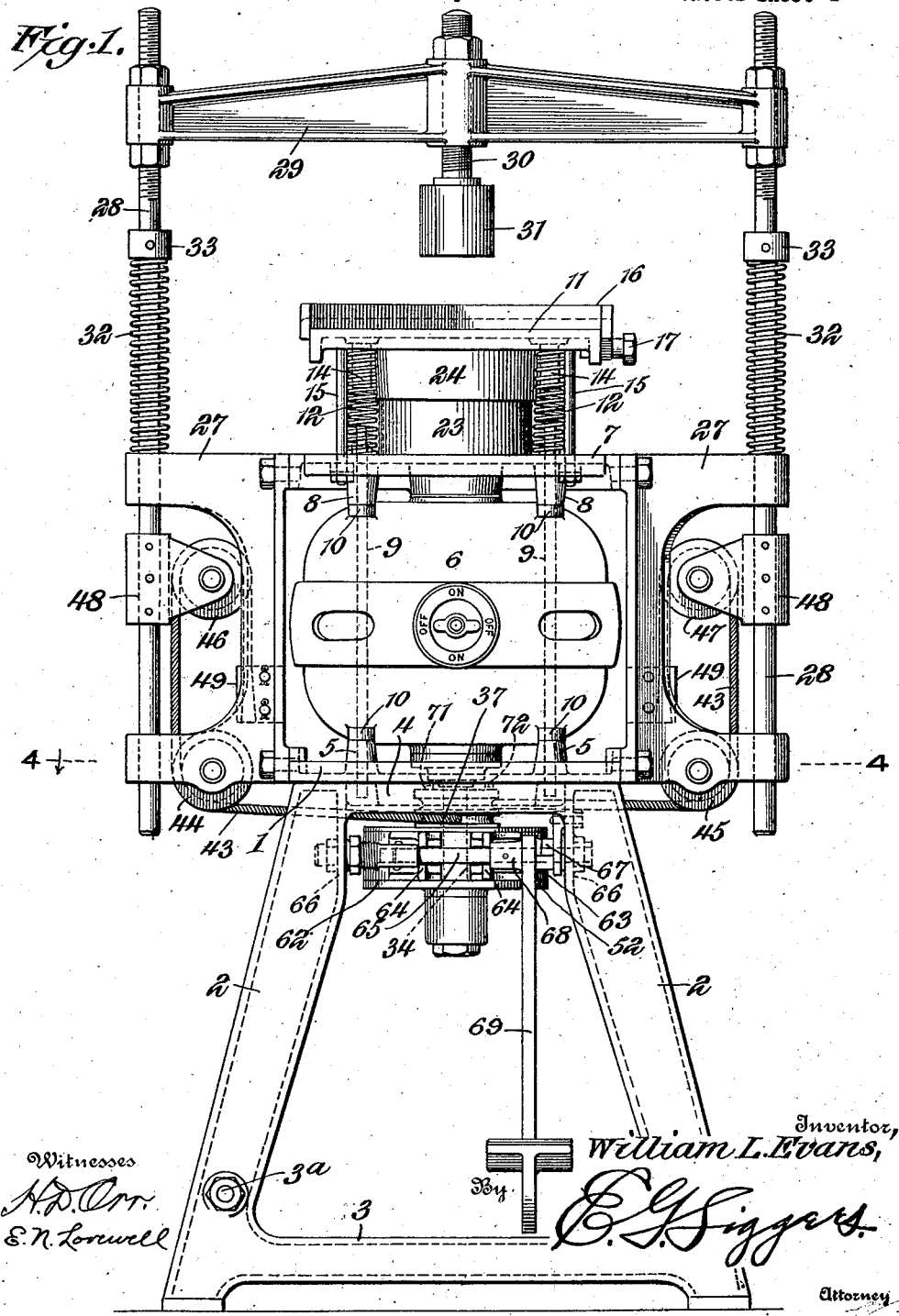
Figure 1 is a front elevation of the machine.

The frame, on which the machine is supported, comprises a base plate 1, supported on legs 2. These legs are in pairs, the legs of each pair being connected near their lower ends by an integral strut 3, and at their upper ends by a web 4 to which the base plate 1 is suitably secured. Each leg is connected to the corresponding leg of the other pair by a tie rod $3^a$. The base plate 1 is formed with upstanding lugs 5 on which a motor 6 is supported, and a top plate 7 is supported by depending lugs 8 from the motor. The top plate 7, the motor 6 and the base plate 1 are secured together by tie rods 9, which extend through the lugs 8 and 5 and through the motor casing, suitable spacers 10 being provided between the lugs and the seats formed in the motor casing.

A work table 11 is resiliently supported above the top plate 7 by means of coil springs 12, which act between the upper surface of the top plate and collars 13, which are adjustably secured to guide pins 14 depending from the under side of the work table. Vertical guide pins 15 extend downwardly from the work table through the top plate 7, and limit the upward movement of the table under the influence of the springs 12. A gage bracket 16 is adjustably secured by set screws 17 or the like to the work table 11, and are of such size and shape as to conform to the character of the work to be joined, which is designated by the numeral 18. The motor shaft 19 extends vertically above and below the motor, and a cutter 20 is secured to its upper end which is adapted to cut a circular channel 21 in the work 18 when the latter is pressed downwardly into engagement therewith. The work table 11 is provided with a seat for receiving an annular plate 22, as shown in Figure 5, which aids in supporting the work during the cutting of the channel, and is provided with an opening large enough to receive the cutter 20. The top plate 7 is formed with an upstanding circular flange 23, which cooperates with a depending flange 24 formed on the underside of the table 11 to form a housing which encloses the cutter 20. A fan 25 is secured to the shaft 19 below the cutter, and is adapted to blow the shavings out through a discharge passageway 26 leading from the cutter housing.

Brackets 27 are secured to opposite sides of the top plate 7 and base plate 1, and in these brackets are vertically movable rods 28 which are connected at their upper ends by a cross head 29. Supported centrally of the cross head is a threaded pin 30, on the lower end of which is a ram 31. The ram may be adjusted vertically on the pin 30, and the cross head 29 may be adjusted vertically on the rods 28, in order to gage the depth to which the ram may descend. The ram is normally held in its uppermost position by coil springs 32 surrounding the rods 28 and acting between the upper ends of the brackets 27 and collars 33 secured to the rods. These collars may be adjusted in order to adjust the tension of the springs 32.

Figure 7:
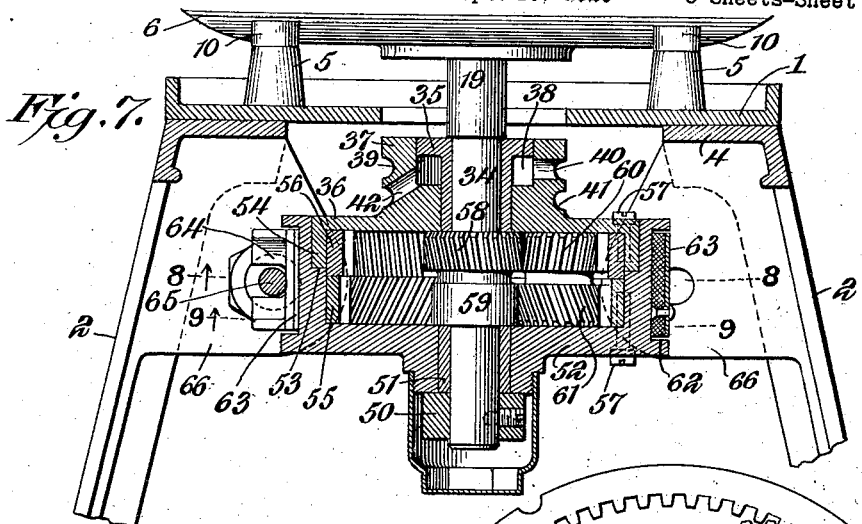
Figure 7 is a central vertical section through the transmission mechanism.
Figure 8:
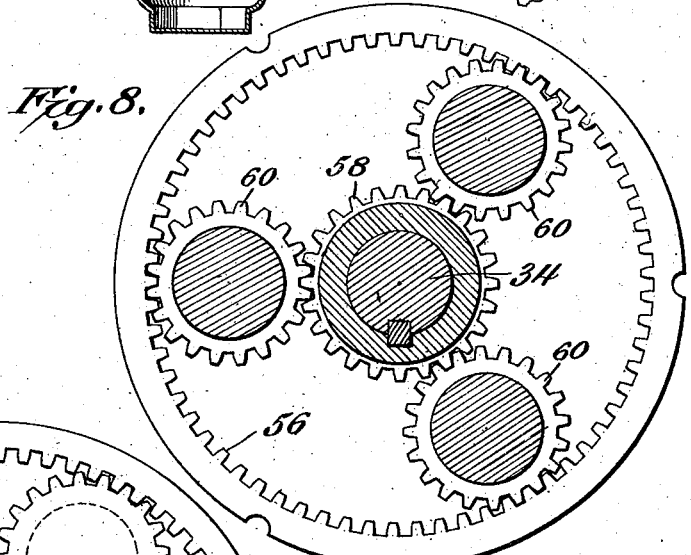
Figure 8 is a horizontal section taken on the line 8—8 of Figure 7.
Figure 9:
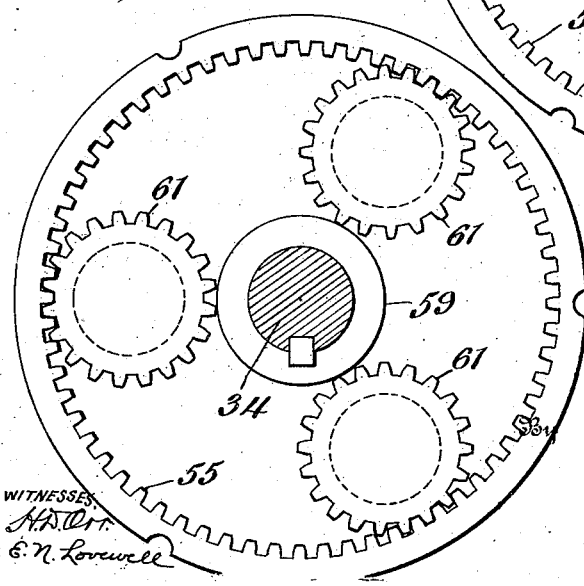
Figure 9 is a horizontal section taken on the line 9—9 of Figure 7.

The mechanism for moving the ram 31 downwardly is driven directly from the lower end of the motor shaft 19 by means of a speed reducing transmission mechanism of novel construction. The lower end of the motor shaft has a reduced portion 34, as shown in Figure 7, on which is mounted a bushing 35. A driven member 36 is mounted on the bushing 35, and forms the upper part of a gear housing. This member 36 is formed with an upwardly extending drum 37 of special construction, which cooperates with the bushing 35 to define an annular space 38. The upper part of the drum 37 has a circumferential groove 39, which is connected to the space 38 by a bore 40. Below the groove 39 is another groove 41 which is connected to the space 38 by an inclined bore 42. A cable 43 is secured in the space 38 between the bushing 35 and the inner wall of the drum 37, and passes through the bores 40 and 42, respectively. These two portions of the cable 43 pass from the drum 37, therefore, in opposite directions, and about pulleys 44 and 45 respectively in brackets 27 at opposite sides of the machine. From the pulleys 44 and 45 the two portions of the cable pass upwardly about pulleys 46 and 47 respectively, mounted in brackets 48, which are secured to the respective rods 28. The ends of the cable are anchored in blocks 49 secured to the respective brackets 27 near their lower ends. It will be seen, therefore, that when the driven member 36 rotates, the two branches of the cable will be wound in the respective grooves 39 and 41, and will draw the brackets 48 and rods 28 downwardly for equal distances, and will consequently lower the cross head 29 and the ram 31.

The transmission mechanism is held on the motor shaft by a collar 50 secured to the lower end of said shaft. Above the collar 50 is a bushing 51 on which is mounted a rotatable housing member 52, and this housing member is formed with an annular shoulder 53 for receiving the depending peripheral flange 54 formed on the member 36, so that the two members 52 and 36 together form a gear housing. Mounted in the lower part of this housing is an internal ring gear 55, and in the upper part of the housing is an internal ring gear 56, which is similar to the gear 55 but has one more tooth, and has a slightly smaller pitch diameter. The ring gears 55 and 56 are keyed to the housing members 52 and 36 respectively, by means of pins 57 or the like. A drive gear 58 is keyed to the motor shaft within the ring gear 56, and is provided with an integral hub 59 disposed in the plane of the ring gear 55. Floating gears 60 connect the drive gear 58 with the ring gear 56, and each floating gear 60 has integrally connected therewith a gear 61 which meshes with the ring gear 55. The hub 59 is of such diameter that its surface is tangent to the circle described by the points of the teeth on the gears 61. The gears 61, when at rest, are held in position by the hub, and when they are revolving, centrifugal force tends to throw them outwardly and prevents friction between the ends of the teeth and the hub.

As shown in the drawings, the ring gear 55 has sixty-four teeth, the ring gear 56 sixty-five teeth, the drive gear 58 twenty-four teeth, and each of the floating gears 60 and 61 twenty teeth, but it will, of course, be understood that the number of teeth may be varied in accordance with the speed ratio desired.

It is apparent that as the motor shaft is rotated, the floating gears will revolve about the same, and for each complete revolution of the floating gears there will be a differential movement between the two ring gears 55 and 56 amounting to the distance of one tooth. If the ring gear 55 and the housing member 52 are free to revolve, the ring gear 56 and the member 36 will remain stationary. If, however, the housing member 52 and ring gear 55 are held stationary, then the differential movement will be imparted to the member 36, and the latter slowly rotated to wind up the cable. For controlling this motion, the periphery of the member 52 is provided with a channel 62, adapted to receive a brake band 63. The ends of this brake band are provided with eyes 64 slidably mounted on a pin 65, which is secured in ears 66 formed at the upper ends of the respective legs 2. In order that both pairs of legs may be made from the same pattern, ears 66 are shown on each, but only one pair of ears is used. A cam 67 is secured at one end of the pin 65, and a sleeve 68, having a cooperating cam surface, is rotatably mounted on the pin between the cam 67 and the adjacent end of the brake band. A pedal 69 is connected to the sleeve 68, and may be pushed downwardly and rearwardly to set the brake. The cam 67 is adjustable circumferentially by means of a pin and arcuate slot 70.

It is not expedient to use spur gears for this transmission, for the reason that the number of teeth on a spur gear can not be increased without increasing either the pitch diameter or the diametral pitch. Consequently, if spur gears are used, either a fractional pitch must be adopted, or one of the ring gears will not mesh properly with the floating gears, and there will be lost motion between the same, resulting in excessive noise and wear. To obviate this difficulty, I have used helical gears.

In order to increase the pitch diameter of a helical gear, and at the same time retain the same number of teeth and the same normal diametral pitch, it is only necessary to increase the angle of the teeth, and conversely, to make the gear of less pitch diameter, it is only necessary to decrease the angle of the teeth.

The angle of the teeth in gear 55, therefore, is made greater than the angle of the teeth in gear 56, and consequently the teeth in gears 61 must be made with a greater angle than the teeth in gears 60, in order to mesh with the teeth of the respective ring gears. In order to retain the same number of teeth in the gears 61 that there are in the gears 60, therefore, the diameters of the gears 61 must be greater than the diameters of the gears 60, and consequently the ring gear 55 must have a greater diameter than the gear 56, and the hub 59 must have a correspondingly less diameter.

It is also obvious that since the ring gear 56 has one more tooth than the ring gear 55, there is only one point in the circumference where a tooth on the gear 56 will be directly above a corresponding tooth on the gear 55. In one of the floating gears, therefore, the centers of the teeth on the gear section 61 are in the same radial plane with the teeth on the corresponding gear section 60, while on the second floating gear the teeth on the gear section 61 are circumferentially in advance of the teeth on the corresponding gear section 60 a distance of one-third of a tooth, and on the third floating gear they are advanced a distance of two-thirds of a tooth. By constructing the floating gears in this manner, they may be arranged at approximately equal distances from each other, and will mesh properly with the drive gear 58 and the respective ring gears. If more than three floating gears are used, the relative positions of the gear sections 60 and 61 will be correspondingly altered.

A stop lug 72 is formed on the under side of the base plate 1, and is adapted to be engaged by a stop lug 71 formed on the upper side of the drum 37 to positively limit the rotation of the latter. As soon as the lug 71 engages the lug 72, therefore, the brake will slip, and as soon as the pedal 69 is released, the action of the springs 12 and 32 will pull upwardly on the cable 43 and restore the driven member 36 to its original position, ready for the next operation. In cutting the channel 21, the annular plate 22 is used as shown in Figure 5, permitting the work table 11 to be gradually pulled downwardly by the action of the cables 43, after the ram 31 has engaged the work 18. The cross head 29 and the ram 31 are so adjusted that when the lug 71 engages the stop lugs 72, the channel 21 will have been cut slightly more than half way through the pieces to be joined.

After the channel 21 has been cut, the plate 22 is replaced by a plate 73, as shown in Figure 6, which has a flange 74 projecting downwardly, and adapted to engage the upper edge of the flange 23 to prevent the work from being lowered. A block 75, which is in the shape of a frustum of a cone is then placed on the boss defined by the inner wall of the channel 21. The base of this block has a diameter slightly less than the inside diameter of the channel, and a ring 76 is placed on the block 75 and forced into the channel by great pressure applied by the ram 31. The ring 76 may be of any suitable shape capable of being expanded sufficiently to be forced into the channel and to grip the inner wall thereof, so as to hold the joint together with great pressure.

It will be noted that a single foot lever serves to actuate the machine, either to cut the channel or to apply the ring. In cutting the channel, a continuous movement of the ram serves first to clamp the work, and then to move the latter slowly and continuously in the direction of the cutter. Likewise in applying the ring, a continuous movement of the ram serves first to center the block 75 and to clamp the latter to the work, and then to force the ring to the bottom of the channel. The depth of the channel should be such that when the ring has been seated, its pressure will be exerted in a plane midway between the surfaces of the pieces joined. By means of the gearing herein described, the speed reduction between the drive gear 58 and the driven member 36, and the consequent multiplication of power has a ratio of approximately 236 to 1. This ratio may, however, be altered by an appropriate alteration in the number of teeth in the ring gears.

While I have shown and described the specific construction of the mechanism which now appears to be most appropriate for the purpose intended, it is to be understood that various modifications may be made in the various details and in the arrangement of the various parts without any material departure from the essential principles embodied therein. It is my purpose, therefore, to include all such modifications within the scope of the appended claims.

What is claimed is:

1. In a machine of the class described, the combination of a frame, a table guided for vertical movement above the frame, a head guided for vertical movement above the table, a vertically disposed power driven shaft beneath the table, a cutter secured to the upper end of the shaft, and mechanism driven by said shaft to move the head progressively downwardly into contact with work supported by the table, and thereby move the work and the table downwardly to cause the work to be operated on by the cutter.

2. In a machine of the class described, the combination of a frame, a table guided for vertical movement above the frame, a head guided for vertical movement above the table, a power driven shaft having a cutter thereon beneath the table, said frame including a top plate in which the cutter shaft is journaled, means to move the head into contact with work supported by the table and thereby move the work and the table downwardly to cause the work to be operated on by the cutter, telescoping flanges formed on the table and top plate respectively and constituting a housing for the cutter, and means including a fan on the cutter shaft for blowing the shavings away from the work.

3. In a machine of the class described, the combination of a frame, a resiliently supported table guided for vertical movement above the frame, a resiliently supported head guided for vertical movement above the table, a power-driven shaft having a cutter thereon beneath the table, a drum driven by said shaft, a cable connected to said drum, means associated with the cable to move the head into contact with work supported by the table when the cable is wound about the drum and thereby move the work and the table downwardly to cause the work to be operated on by the cutter.

4. In a machine of the class described, the combination of a frame, a motor mounted in the frame, a vertical motor shaft extending upwardly and downwardly from said motor, a cutter carried by the upper end of said shaft, a resiliently supported table for supporting work above the cutter, said table being depressible into contact with the cutter, speed reduction gearing driven from the lower portion of said shaft, and means operable by said gearing to clamp the work to the table and depress the latter.

5. In a machine of the class described, the combination of a frame, a motor mounted in the frame, a vertical motor shaft extending upwardly and downwardly from said motor, a cutter carried by the upper end of said shaft, a resiliently supported table for supporting work above the cutter, a resiliently supported head guided for vertical movement above the table, speed reduction gearing operatively connected to the lower end of the motor shaft, a drum driven by said gearing, a cable connected to the drum, and means associated with the cable to move the head into contact with work supported by the table when the cable is wound about the drum and thereby move the fork and table downwardly to cause the work to be operated on by the cutter.

6. In a machine of the class described, the combination of a frame, a motor mounted in the frame, a vertical motor shaft extending upwardly and downwardly from the motor, a cutter carried by the upper end of said shaft, a resiliently supported table for supporting work above the cutter, speed reduction gearing driven from the lower portion of said shaft, cooperating stop lugs on said frame and gearing respectively to positively limit the rotation of the latter, a vertically movable member, a head carried thereby, and means operable by said gearing to move said member and head downwardly to clamp the work to the table and depress the latter, said head being vertically adjustable on the member by which it is carried so as to gage the depth to which it will be depressed before said stop lugs engage each other.

7. In a machine of the class described, the combination of a frame, a motor mounted in the frame, a vertical motor shaft extending upwardly and downwardly from said motor, a cutter carried by the upper end of said shaft, speed reduction gearing driven from the lower portion of said shaft, a resiliently supported table for supporting work above the cutter, a resiliently supported head guided for vertical movement above the table, a drum driven by said gearing, a cable connected to said drum, means associated with the cable to move the head into contact with the work supported by the table when the cable is wound about the drum and thereby to move the work and the table downwardly to cause the work to be operated on by the cutter, and cooperating lugs on said frame and drum respectively to positively limit the rotation of the latter, said head being vertically adjustable on the member by which it is carried so as to gage the depth to which it will be depressed when said stop lugs engage each other.

8. In a machine of the class described, the combination of a power driven shaft, a work engaging member at one end thereof, a self-contained complete speed reduction gearing unit mounted on the other end of the shaft and driven thereby, and a work engaging member movable by said gearing toward the first work engaging member so as to engage the work from the opposite side.

9. In a machine of the class described, the combination of a power driven shaft, a work engaging member at one end thereof, a self-contained complete speed reduction unit mounted on one end of the shaft and driven thereby, a drum driven by said gearing unit, a second work engaging member, and cables connecting the latter to the drum so as to move said second work engaging member toward the first to clamp the work between the two members.

10. In a machine of the class described, the combination of a power driven shaft, a work engaging member at one end thereof, a self-contained, friction-controlled complete speed reduction gearing unit mounted on the other end of the shaft and driven thereby, a second work engaging member movable by said gearing toward the first work engaging member, resilient means resisting said movement, and co-engaging stop lugs to positively limit the movement of said gearing and thereby limit the movement of the second work engaging member.

11. In a machine of the class described, the combination of a frame, a cutter mounted therein, a work supporting table resiliently supported above the cutter, a head supported above the table, means for driving said cutter and at the same time moving the head downwardly into contact with the work and thereby depressing the latter into contact with the cutter, and means adapted to be interposed between the work and the frame so as to positively prevent the work from being engaged by the cutter while the head is used for forcing on the ring.

12. In a machine of the class described, the combination of a frame, a vertical shaft mounted thereon and having a cutter at its upper end, a work supporting table resiliently supported above the cutter, a head supported above the table, means for driving the cutter shaft, means driven by the cutter shaft for moving the head downwardly into contact with the work and thereby depressing the latter into contact with the cutter, and means adapted to be interposed between the work and the frame so as to positively prevent the work from being engaged by the cutter while the head is used for forcing on the ring.

13. In a machine of the class described, the combination of a power shaft, a table mounted above the shaft, a drum journaled on said shaft, a self-contained complete speed reduction gearing unit mounted on the shaft and driving the drum from said shaft, a cable passing through said drum and adapted to be partially wound about the same, a work engaging member supported above the table, and means operable by said cable to move said member toward the table.

14. In a machine of the class described, the combination of a substantially vertical power shaft, a cutter secured to the upper end thereof, a table mounted above the cutter, a drum journaled on the lower portion of said shaft, speed reduction gearing for driving the drum from the shaft, a cable passing through said drum and adapted to be partially wound about the same, a member supported above the table, and means operable by said cable to move said member into engagement with work supported by the table and thereby move the work into engagement with the cutter.

15. In a machine of the class described, the combination of a substantially vertical power shaft, a cutter secured to the upper end thereof, a table resiliently supported above the cutter, a drum journaled on the lower portion of said shaft, speed reduction gearing for driving the drum from the shaft, a cable passing through said drum and adapted to be partially wound about the same, a head supported above the table, means operable by said cable to move said head into engagement with work supported by the table and thereby move the work and table downwardly until the work is engaged by the cutter, means for positively limiting the rotational movement of the drum, and means for adjustably gaging the depth to which the head will move before the rotation of the drum ceases.

In testimony that I claim the foregoing as my own, I have hereto affixed my signature.

WILLIAM LEWIS EVANS.